(12) United States Patent
King et al.

(10) Patent No.: US 11,454,639 B2
(45) Date of Patent: Sep. 27, 2022

(54) ANALYSIS SYSTEM, ANALYSIS ASSISTANCE DEVICE, ANALYSIS EXECUTION METHOD AND ANALYSIS ASSISTANCE METHOD

(71) Applicant: SHIMADZU CORPORATION, Kyoto (JP)

(72) Inventors: Gregory King, Kyoto (JP); Daiki Fukushima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 245 days.

(21) Appl. No.: 17/012,695

(22) Filed: Sep. 4, 2020

(65) Prior Publication Data
US 2021/0072271 A1    Mar. 11, 2021

(30) Foreign Application Priority Data
Sep. 6, 2019   (JP) .............................. JP2019-162658

(51) Int. Cl.
*G01N 35/00* (2006.01)
*G01N 30/12* (2006.01)
*G01N 30/88* (2006.01)
*G01N 30/16* (2006.01)
*G01N 30/24* (2006.01)
*G01N 35/10* (2006.01)

(52) U.S. Cl.
CPC ......... *G01N 35/1009* (2013.01); *G01N 30/12* (2013.01); *G01N 30/16* (2013.01); *G01N 30/88* (2013.01); *G01N 2030/126* (2013.01)

(58) Field of Classification Search
CPC .... G01N 30/16; G01N 35/1009; G01N 30/88; G01N 30/12; G01N 30/24
USPC .......................................................... 436/43
See application file for complete search history.

(56) References Cited

U.S. PATENT DOCUMENTS 5,297,431 A * 3/1994 White ................... G01N 30/06
                                               73/864.22
5,305,650 A * 4/1994 Koike ...................... G01N 1/28
                                               73/864.21

FOREIGN PATENT DOCUMENTS

JP           2018-197669 A    12/2018

* cited by examiner

*Primary Examiner* — Arlen Soderquist
(74) *Attorney, Agent, or Firm* — Sughrue Mion, PLLC

(57) ABSTRACT

At least one of method information representing an analysis execution method to be used for analysis of a sample and device information for specifying the configuration of an analysis device is acquired as analysis information by an analysis information acquirer. Syringe information for specifying the configuration of a syringe is acquired by a syringe information acquirer. Based on the analysis information and the syringe information, whether the syringe is suitable for analysis of the sample is judged by a judge. The result of judgement by the judge is presented by a presenter.

11 Claims, 4 Drawing Sheets

ANALYSIS SYSTEM, ANALYSIS ASSISTANCE DEVICE, ANALYSIS EXECUTION METHOD AND ANALYSIS ASSISTANCE METHOD

BACKGROUND OF THE INVENTION

Field of the Invention

The present invention relates to an analysis system, an analysis assistance device, an analysis execution method and an analysis assistance method.

Description of Related Art

A chromatograph that separates substances included in a sample into different components has been known. For example, in a gas chromatograph described in JP 2018-197669 A, a carrier gas is supplied to a sample vaporization chamber. Further, a sample is injected into the sample vaporization chamber by a microsyringe. The sample vaporized in the sample vaporization chamber is introduced into a column together with the carrier gas. The sample that has been introduced into the column is separated into compounds and detected by a detector. A chromatogram is produced as a result of analysis based on a detection signal provided by the detector.

BRIEF SUMMARY OF THE INVENTION

It is necessary to select a syringe suitable for an analysis method or an analysis device in order to acquire a result of accurate analysis of a sample. However, because there are a wide variety of types of analysis methods or analysis devices, it may not be easy to select a suitable syringe. Further, even in a case where a suitable syringe is not selected, a setting of the analysis device does not become invalid, and a result of analysis is likely to be acquired normally. Although such a result of analysis is not accurate, in a case where a user is unskilled, it is difficult to determine whether the result of analysis is accurate.

An object of the present invention is to provide an analysis system, an analysis assistance device, an analysis execution method and an analysis assistance method that enables easy acquisition of a result of accurate analysis of a sample.

One aspect of the present invention relates to an analysis system including an analysis device that includes an analyzer for analyzing a sample and a sample injector that has a syringe and supplies the sample to the analyzer, an analysis information acquirer that acquires at least one of method information representing an analysis method to be used for analysis of the sample and device information for specifying a configuration of the analysis device as analysis information, a syringe information acquirer that acquires syringe information for specifying a configuration of the syringe, a judge that judges whether the syringe is suitable for analysis of the sample based on the analysis information acquired by the analysis information acquirer and the syringe information acquired by the syringe information acquirer, and a presenter that presents a result of judgement by the judge.

Another aspect of the present invention relates to an analysis assistance device used by an analysis device including an analyzer for analyzing a sample and a sample injector that has a syringe and supplies the sample to the analyzer that includes an analysis information acquirer that acquires at least one of method information representing an analysis method to be used for analysis of the sample and device information for specifying a configuration of the analysis device as analysis information, a syringe information acquirer that acquires syringe information for specifying a configuration of the syringe, a judge that judges whether the syringe is suitable for analysis of the sample based on the analysis information acquired by the analysis information acquirer and the syringe information acquired by the syringe information acquirer, and a presenter that presents a result of judgement by the judge.

Yet another aspect of the present invention relates to an analysis execution method that includes supplying a sample to an analyzer for analyzing a sample by a sample injector with use of a syringe in an analysis device, acquiring at least one of method information representing an analysis method to be used for analysis of the sample and device information for specifying a configuration of the analysis device as analysis information, acquiring syringe information for specifying a configuration of the syringe of the sample injector, judging whether the syringe is suitable for analysis of the sample based on the analysis information and the syringe information, and presenting a result of judgement.

Yet another aspect of the present invention relates to an analysis assistance method used by an analysis device that includes an analyzer for analyzing a sample and a sample injector that has a syringe and supplies the sample to the analyzer, acquiring at least one of method information representing an analysis execution method to be used for analysis of the sample and device information for specifying a configuration of the analysis device as analysis information, acquiring syringe information for specifying a configuration of the syringe, judging whether the syringe is suitable for analysis of the sample based on the analysis information and the syringe information, and presenting a result of judgement.

Advantageous Effects of Invention

The present invention enables easy acquisition of a result of accurate analysis.

Other features, elements, characteristics, and advantages of the present invention will become more apparent from the following description of preferred embodiments of the present invention with reference to the attached drawings.

DESCRIPTION OF THE PREFERRED EMBODIMENTS

(1) Configuration of Analysis System

Figure 1:
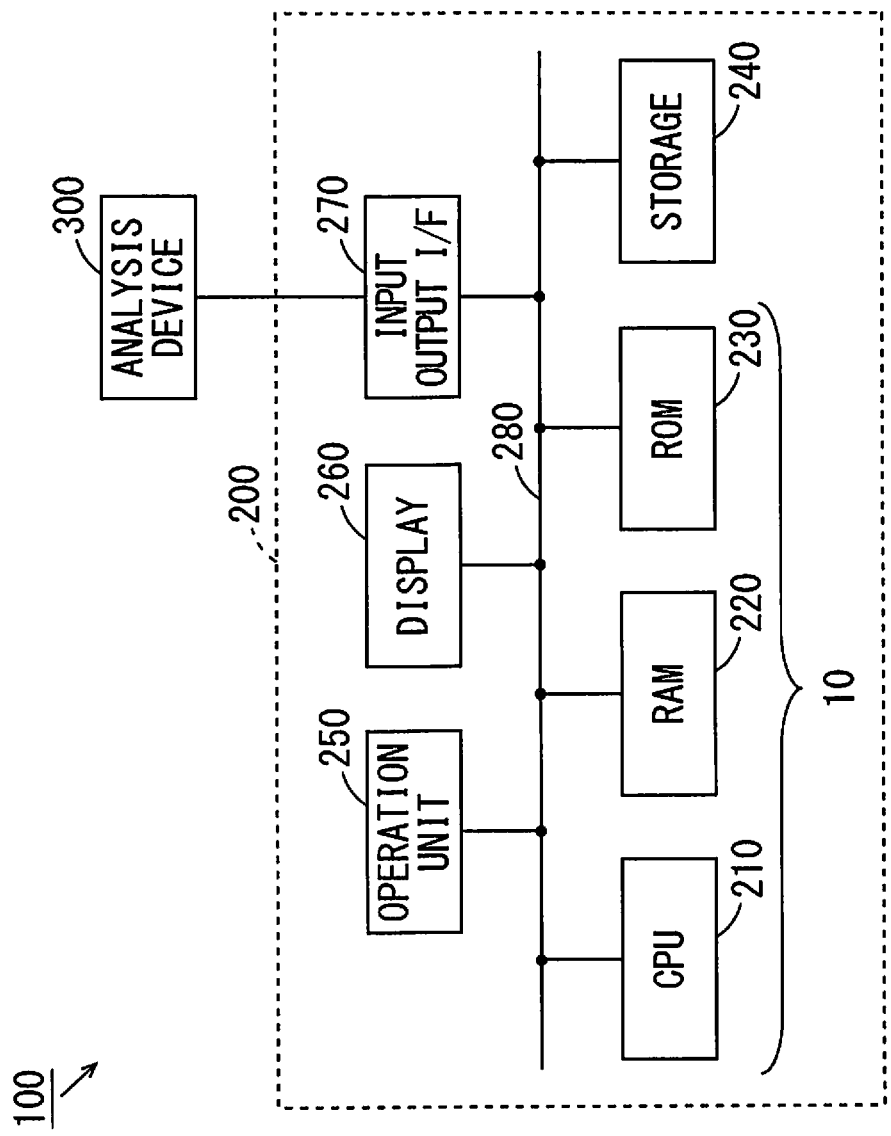
FIG. 1 is a diagram showing the configuration of an analysis system according to one embodiment of the present invention.

An analysis system, an analysis assistance device, an analysis execution method and an analysis assistance method according to an embodiment of the present invention will be described below with reference to the drawings. FIG. 1 is a diagram showing the configuration of the analysis system according to one embodiment of the present invention. As shown in FIG. 1, the analysis system 100 includes a processing device 200 and an analysis device 300.

The processing device 200 is constituted by a CPU (Central Processing Unit) 210, a RAM (Random Access Memory) 220, a ROM (Read Only Memory) 230, a storage 240, an operation unit 250, a display 260 and an input output I/F (interface) 270 and a bus 280. The CPU 210, the RAM 220, the ROM 230, the storage 240, the operation unit 250, the display 260 and the input output I/F 270 are connected to the bus 280. The CPU 210, the RAM 220 and the ROM 230 constitute the analysis assistance device 10. Details of the analysis assistance device 10 will be described below.

The RAM 220 is used as a work area for the CPU 210. A system program is stored in the ROM 230. The storage 240 includes a storage medium such as a hard disc or a semiconductor memory, and stores an analysis assistance program. The CPU 210 executes the analysis assistance program stored in the storage 240 on the RAM 220, whereby an analysis assistance process described below is performed.

The operation unit 250 is an input device such as a keyboard, a mouse or a touch panel. The display 260 is a display device such as a liquid crystal display device. A user can provide a variety of inputs to the analysis assistance device 10 using the operation unit 250. The display 260 can display a result of process performed by the analysis assistance device 10. The input output I/F 270 is connected to the analysis device 300.

(2) Analysis Device

Figure 2:
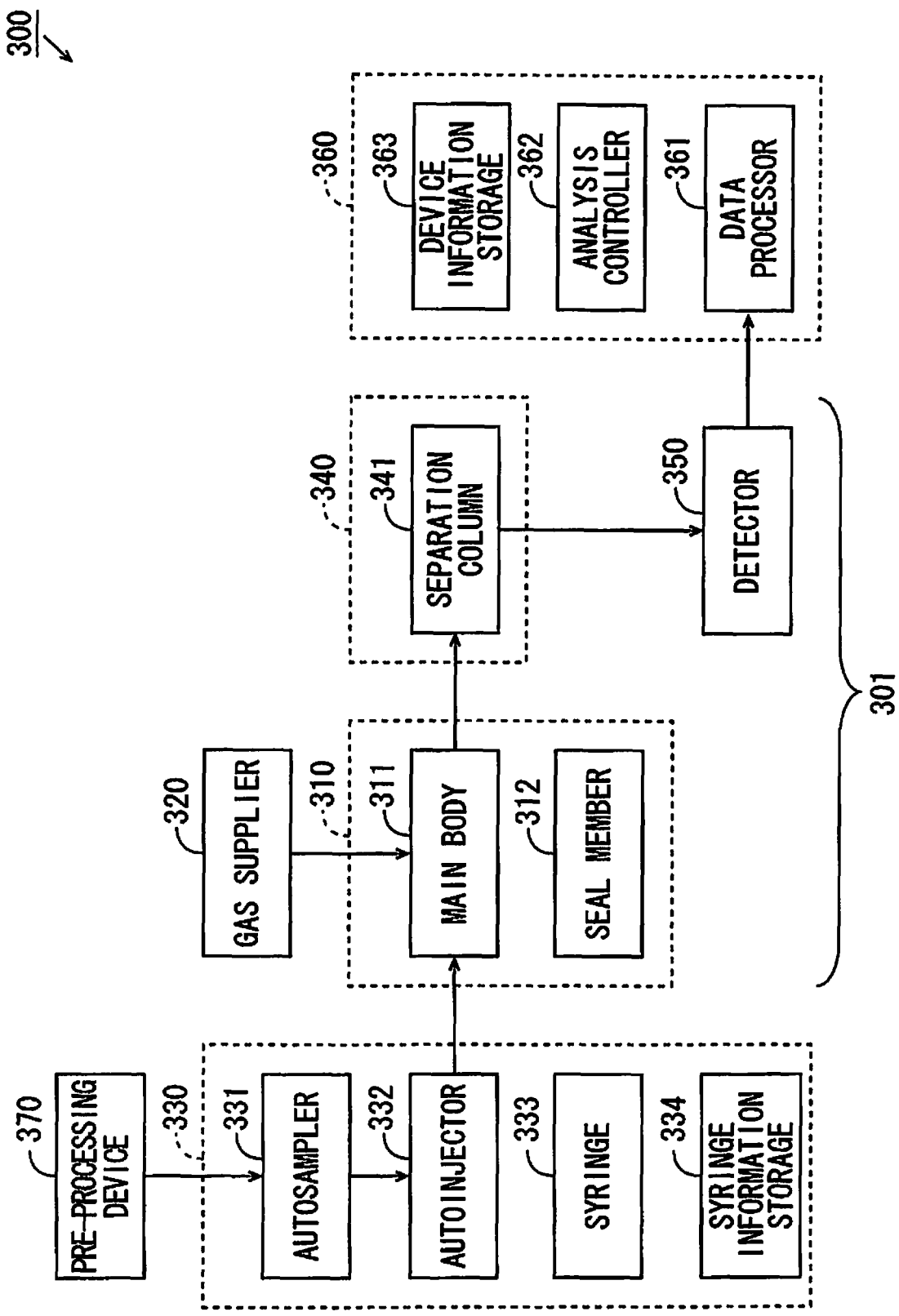
FIG. 2 is a diagram showing the configuration of an analysis device of FIG. 1.

FIG. 2 is a diagram showing the configuration of the analysis device 300 of FIG. 1. As shown in FIG. 2, in the present embodiment, the analysis device 300 is a gas chromatograph and includes a sample vaporization chamber 310, a gas supplier 320, a sample injector 330, a column oven 340, a detector 350 and a processing device 360. An analyzer 301 is constituted by the sample vaporization chamber 310, the column oven 340 and the detector 350. Further, the analysis device 300 may further include a pre-processing device 370 that prepares a sample.

The sample vaporization chamber 310 includes a main body 311 and a seal member 312. The seal member 312 is a septum formed of a rubber member, for example, and seals the main body 311. The seal member 312 is an expendable part. Therefore, in order to prevent degradation of sealability of the main body 311, it is necessary for the seal member 312 to be replaced in a case where the seal member 312 is used a predetermined number of times that the seal member 312 is usable. A gas supplier 320 includes a gas cylinder, for example, and supplies a carrier gas into the main body 311 of the sample vaporization chamber 310.

The sample injector 330 includes an autosampler 331, an autoinjector 332, a syringe 333 and a syringe information storage 334. The autosampler 331 transports a container in which a liquid sample to be analyzed is sealed to a predetermined position.

The sample may be pre-processed by the pre-processing device 370. The autoinjector 332 sucks a predetermined amount of sample from the container transported by the autosampler 331 with the syringe 333. The autoinjector 332 supplies the sample sucked by the syringe 333 into the main body 311 with a needle of the syringe 333 inserted into the seal member 312 of the sample vaporization chamber 310.

The syringe information storage 334 stores the syringe information for specifying the configuration of the syringe 333. The syringe information may include any or all of a barrel size, a barrel material, a plunger size, a plunger material, a tip shape, a tip material and a size of a syringe needle. Further, the syringe information may include information such as a syringe size, a part number, a plunger type, a gauge or a syringe type.

The syringe information may be stored in the syringe information storage 334 by reading of an RFID (Radio Frequency Identification) tag or a barcode attached to the syringe 333. Alternatively, the syringe information may be stored in the syringe information storage 334 by connection of a predetermined USB (Universal Serial Bus) memory to the sample injector 330.

The column oven 340 includes a separation column 341 and stores the separation column 341 while maintaining the separation column 341 at a certain temperature. The sample is vaporized in the main body 311 of the sample vaporization chamber 310 and introduced into the separation column 341 in the column oven 340 together with the carrier gas. The separation column 341 separates the introduced sample into its components according to differences in chemical property or composition. The detector 350 detects the components into which the sample is separated by the separation column 341 and outputs a detection signal corresponding to the detection intensity to the processing device 360.

The processing device 360 is constituted by a CPU and a memory, for example, and includes a data processor 361, an analysis controller 362 and a device information storage 363. The processing device 360 may be realized by the processing device 200 of FIG. 1. The data processor 361 processes the detection signal output by the detector 350, thereby producing a gas chromatogram representing the relationship between the retention time of each component and the detection intensity.

The analysis controller 362 make a setting in regard to a running condition of the analysis device 300 and controls an operation of each constituent element based on the setting. The setting in regard to the running condition of the analysis device 300 includes the setting in regard to the number of times that the seal member 312 is usable or the setting in regard to the moving speed of the syringe 333. A suitable setting in regard to the running condition differs depending on the size (thickness) of a needle of the syringe 333. Further, the analysis controller 362 measures the number of times the seal member 312 has been used (the number of times that the needle of the syringe 333 has been inserted into the seal member 312), etc.

The device information storage 363 stores the device information for specifying the configuration of the analysis device 300. The device information includes a plurality of element information pieces for respectively specifying the plurality of constituent elements (the separation column 341, the detector 350, the pre-processing device 370 or the like) in the analysis device 300, and the setting in regard to the running condition of the analysis device 300.

(3) Analysis Assistance Device

Figure 3:
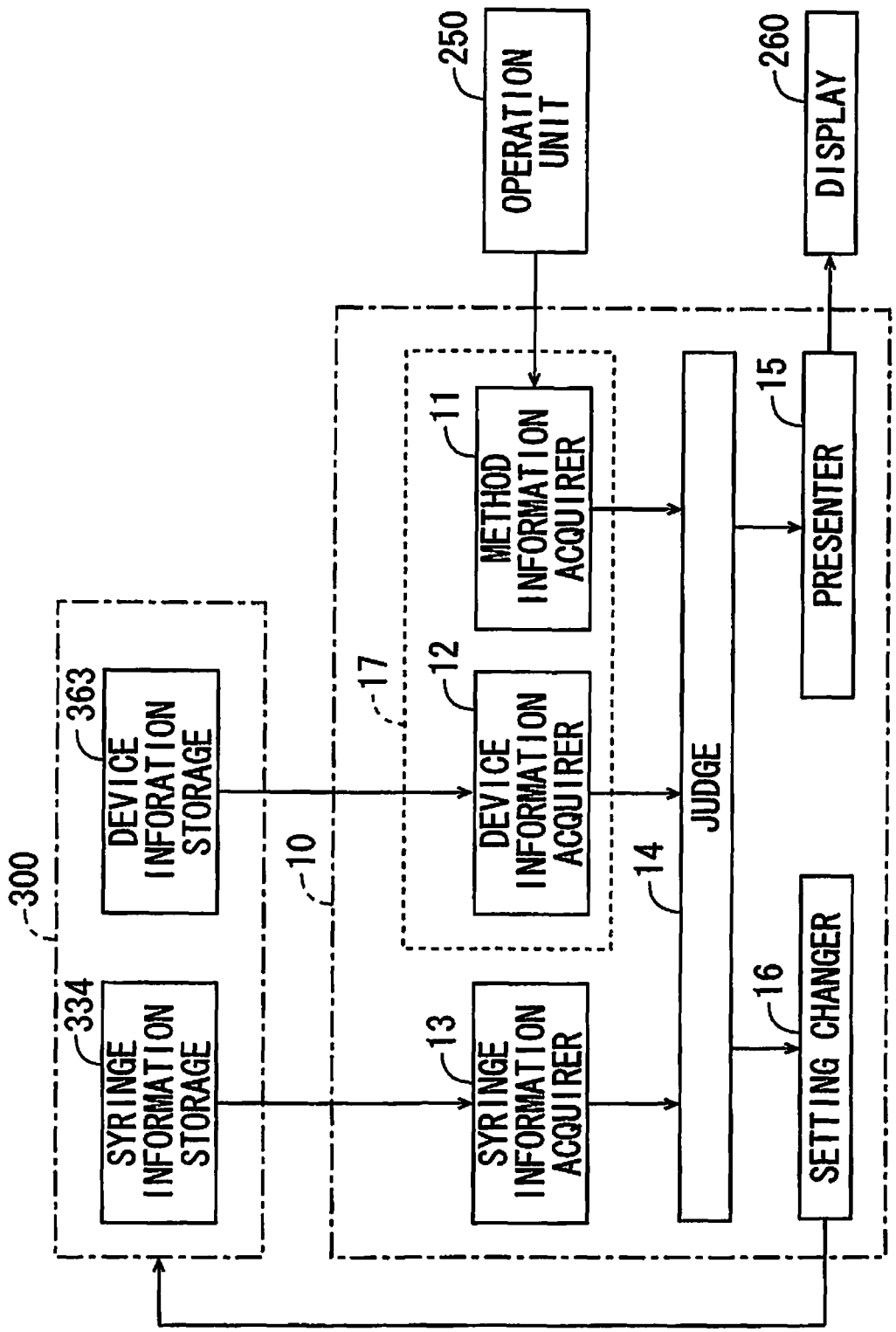
FIG. 3 is a diagram showing the configuration of an analysis assistance device of FIG. 1.

FIG. 3 is a diagram showing the configuration of the analysis assistance device 10 of FIG. 1. As shown in FIG. 3, the analysis assistance device 10 includes a method information acquirer 11, a device information acquirer 12, a syringe information acquirer 13, a judge 14, a presenter 15 and a setting changer 16 as functions. The CPU 210 of FIG. 1 executes the analysis assistance program stored in the storage 240, whereby the functions of the analysis assistance device 10 are implemented. Part or all of the functions of the analysis assistance device 10 may be implemented by hardware such as an electronic circuit.

An analysis information acquirer 17 is constituted by the method information acquirer 11 and the device information acquirer 12. The method information acquirer 11 acquires the method information representing an analysis method to be used for analyzing a sample from the operation unit 250. The analysis method includes a method of injecting a sample, for example. The user can input desired method information by operating the operation unit 250. The device information acquirer 12 acquires the device information from the device information storage 363. The device information may be acquired automatically at the time of activation of the analysis device 300, or may be acquired in response to an operation of the operation unit 250 by the user.

The syringe information acquirer 13 acquires the syringe information. The syringe information may be acquired directly from the syringe information storage 334, or may be acquired indirectly via the processing device 360 of FIG. 2. Further, the syringe information may be automatically acquired at the time of activation of the sample injector 330, or may be acquired in response to an operation of the operation unit 250 by the user. Alternatively, the syringe information may be acquired from the operation unit 250. In this case, the user can input the syringe information by operating the operation unit 250.

The judge 14 judges whether the syringe 333 attached to the autoinjector 332 of FIG. 2 is suitable for analysis. Whether the syringe 333 is suitable for analysis is judged by comparison of the method information acquired by the method information acquirer 11 or the device information acquired by the device information acquirer 12 with the syringe information acquired by the syringe information acquirer 13. The presenter 15 presents a result of judgement by the judge 14 to the user.

As a method of presentation, in a case where the syringe 333 is unsuitable for analysis, the character string indicating the unsuitability is displayed in the display 260 in the present embodiment. However, the embodiment is not limited to this. In a case where the syringe 333 is suitable for analysis, the character string indicating the suitability may be displayed in the display 260. Alternatively, in a case where the syringe 333 is either suitable or unsuitable for analysis, the character string indicating the suitability or unsuitability may be displayed in the display 260.

As another method of presentation, in a case where the analysis system 100 has a sound output device, the sound (including a sound such as a buzzer) corresponding to the content of result of judgement may be output from the sound output device. In a case where the analysis system 100 has an indicator light such as a lamp, the indicator light may be turned on or off in a manner corresponding to the content of result of judgement.

Even in a case where the judge 14 judges that the syringe 333 is unsuitable for analysis, if the setting in regard to the running condition of the analysis device 300 is changed, the syringe 333 may become suitable for analysis. In such a case, the setting changer 16 changes the setting. At this time, the presenter 15 may present to the user by the above-mentioned various methods that the setting in regard to the running condition of the analysis device 300 is to be changed.

(4) Example of Suitability Judgement

As a first example of judgement whether the syringe 333 is suitable for analysis, the analysis execution method is an on-column injection method. Here, in a case where the size of needle of the syringe 333 represented by the syringe information is equal to or smaller than a predetermined size, the judge 14 judges that the syringe 333 is suitable for analysis.

On the other hand, in a case where the size of needle of the syringe 333 is larger than the predetermined size, the judge 14 judges that the syringe 333 is unsuitable for analysis, and the presenter 15 presents the unsuitability to the user. Thus, the user can cause the analysis device 300 to perform the on-column injection method using the appropriate syringe 333.

As a second example of judgement, the device information includes the pre-processing device 370 that prepares a sample by using a derivatizing agent. Here, in a case where the syringe 333 represented by the syringe information is a syringe having a fluororesin tip, the judge 14 judges that the syringe 333 is suitable for analysis. Fluororesin includes PTFE (polytetrafluoroethylene), for example.

On the other hand, in a case where the syringe 333 is not a syringe having a fluororesin tip, the judge 14 judges that the syringe 333 is unsuitable for analysis, and the presenter 15 presents the unsuitability to the user. Thus, the user can cause the pre-processing device 370 to appropriately perform the pre-process while preventing adherence of the derivatizing agent to a plunger or the reaction of the plunger.

As a third example of judgment, in a case where the setting in regard to the number of times that the seal member 312 is usable represented by the device information is suitable for the size of needle of the syringe 333 represented by the syringe information, the judge 14 judges that the syringe 333 is suitable for analysis. On the other hand, in a case where the setting in regard to the number of times that the seal member 312 is usable is unsuitable for the size of needle of the syringe 333, the judge 14 judges that the syringe 333 is unsuitable for analysis, and the presenter 15 presents the unsuitability to the user. Further, the setting is changed by the setting changer 16 to be suitable for the size of needle of the syringe 333.

The appropriate correspondence relationship between the size of needle of the syringe 333 and the number of times that the seal member 312 is usable is registered in the setting changer 16. In this correspondence relationship, the smaller the size of needle of the syringe 333 is, the larger the number of times that the seal member 312 is usable is. Thus, the user can replace the seal member 312 at a point in time at which the seal member 312 of FIG. 2 is used the number of times that the seal member 312 is usable suitable for the size of needle of the syringe 333. As a result, degradation of sealability of the main body 311 of the sample vaporization chamber 310 of FIG. 2 can be prevented and appropriate analysis can be performed.

As a fourth example of judgement, in a case where the moving speed of the syringe 333 represented by the device information is suitable for the size of needle of the syringe 333 represented by the syringe information, the judge 14 judges that the syringe 333 is suitable for analysis. On the other hand, in a case where the setting in regard to the moving speed is unsuitable for the size of needle of the syringe 333, the judge 14 judges that the syringe 333 is unsuitable for analysis, and the presenter 15 presents the unsuitability to the user. Further, the setting is changed by the setting changer 16 to be suitable for the size of needle of the syringe 333.

The appropriate correspondence relationship between the size of needle of the syringe 333 and the moving speed of the syringe 333 is registered in the setting changer 16. In this correspondence relationship, the smaller the size of needle of the syringe 333 is, the smaller the moving speed of the syringe 333 is. Thus, the syringe 333 is moved at a speed suitable for the size of needle. As a result, when the needle of the syringe 333 is inserted into the container in which the sample is sealed or the seal member 312, the needle can be prevented from bending or being damaged.

(5) Analysis Assistance Process

Figure 4:
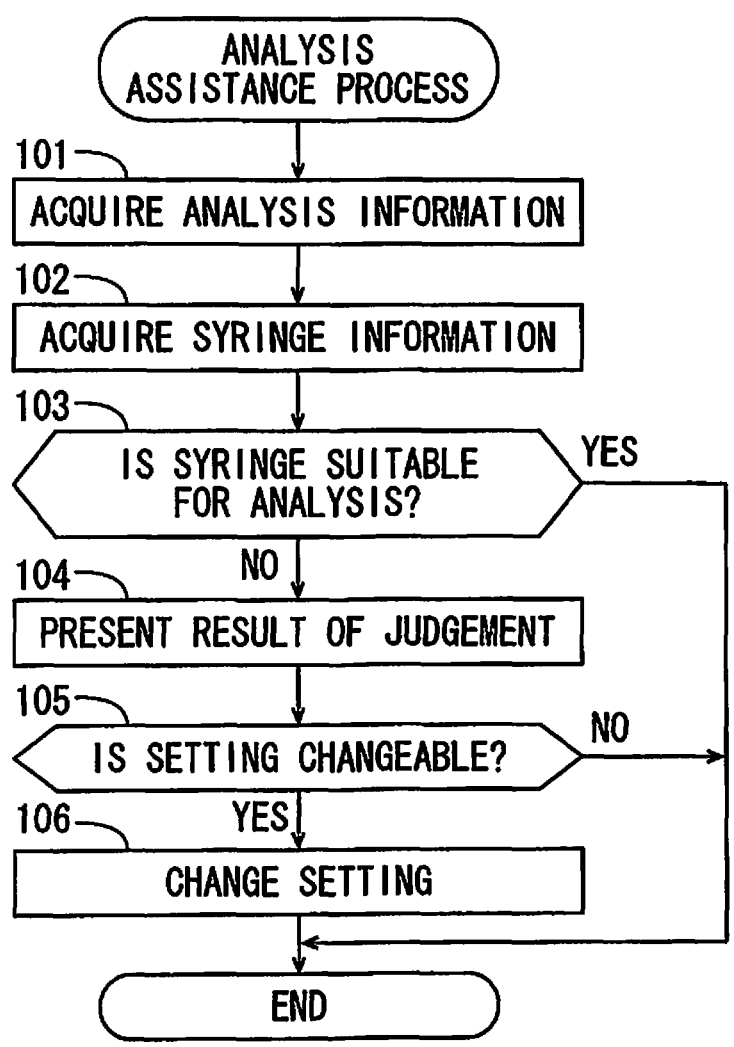
FIG. 4 is a flow chart showing one example of the algorithm of an analysis assistance process executed by an analysis assistance program.

FIG. 4 is a flow chart showing one example of the algorithm of the analysis assistance process executed by the analysis assistance program. One example of the analysis assistance process will be described below with reference to the analysis device 300 of FIG. 2, the analysis assistance device 10 of FIG. 3 and the flow chart of FIG. 4.

As shown in FIG. 4, the analysis information acquirer 17 acquires at least one of the method information and the device information as the analysis information (step 101). Further, the syringe information acquirer 13 acquires the syringe information (step 102). Either the step 101 or 102 may be performed first, or both of the steps 101 and 102 may be performed at the same time.

Next, the judge 14 judges whether the syringe 333 is suitable for analysis based on the analysis information acquired in the step 101 and the syringe information acquired in the step 102 acquired in the step 102 (step 103). In a case where the syringe 333 is suitable for analysis, the judge 14 ends the analysis assistance process. In a case where the syringe 333 is unsuitable for analysis, the presenter 15 presents the result of judgement to the user (step 104).

Thereafter, the setting changer 16 judges whether the setting is changeable such that the syringe 333 becomes suitable for analysis (step 105). In a case where the setting is not changeable, the setting changer 16 ends the analysis assistance process. In a case where the setting is changeable, the setting changer 16 changes the setting such that the syringe 333 becomes suitable for analysis (step 106), and ends the analysis assistance process.

(6) Effects

In the analysis system 100 according to the present embodiment, at least one of the method information representing the analysis method to be used for analysis of the sample and the device information for specifying the configuration of the analysis device is acquired by the analysis information acquirer 17 as the analysis information. The syringe information for specifying the configuration of the syringe 333 of the sample injector 330 is acquired by the syringe information acquirer 13. Based on the analysis information and the syringe information, whether the syringe 333 is suitable for analysis of the sample is judged by the judge 14. The result of judgement by the judge 14 is presented by the presenter 15.

With this configuration, even in a case where being unskilled, the user can easily determine whether the syringe 333 in use is suitable for analysis of the sample by identifying the result of judgement presented by the presenter 15. For example, in a case where the syringe 333 that is unsuitable for analysis of the sample is in use, the user determines that the syringe 333 is unsuitable for analysis of the sample by identifying the result of judgement. Thus, the user can easily select the syringe 333 suitable for analysis of the sample without selecting the syringe 333 that is unsuitable for analysis of the sample. As a result, a result of accurate analysis of the sample can be easily acquired.

Further, in a case where the syringe 333 becomes suitable for analysis by a change of the setting in regard to the running condition of the analysis device 300, the setting is changed by the setting changer 16 such that the syringe 333 becomes suitable for analysis of the sample. Therefore, it is not necessary for the user to change the setting in regard to the running condition of the analysis device 300. Thus, even in a case where being unskilled, the user can acquire a result of accurate analysis of the sample more easily. Further, an error in changing the setting by the user can be prevented.

(7) Other Embodiments (a) While the analysis assistance device 10 includes the setting changer 16 in the above-mentioned embodiment, the embodiment is not limited to this. The analysis assistance device 10 does not have to include the setting changer 16. In this case, the steps 105 and 106 in the analysis assistance process are not performed.

(b) While the analysis device 300 is a gas chromatograph in the above-mentioned embodiment, the embodiment is not limited to this. The analysis device 300 may be another analysis device including the syringe 333.

(c) While the setting in regard to the running condition of the analysis device 300 includes the setting in regard to the number of times that the seal member 312 is usable or the moving speed of the syringe 333 in the above-mentioned embodiment, the embodiment is not limited to this. As long as an appropriate setting differs depending on the type of the syringe 333, the setting in regard to the running condition of the analysis device 300 may be a setting for another item.

(8) Aspects (Item 1) An analysis system according to one aspect may include an analysis device that includes an analyzer for analyzing a sample and a sample injector that has a syringe and supplies the sample to the analyzer, an analysis information acquirer that acquires at least one of method information representing an analysis method to be used for analysis of the sample and device information for specifying a configuration of the analysis device as analysis information, a syringe information acquirer that acquires syringe information for specifying a configuration of the syringe, a judge that judges whether the syringe is suitable for analysis of the sample based on the analysis information acquired by the analysis information acquirer and the syringe information acquired by the syringe information acquirer, and a presenter that presents a result of judgement by the judge.

In this analysis system, at least one of the method information representing the analysis method to be used for analysis of the sample and the device information for specifying the configuration of the analysis device is acquired by the analysis information acquirer as the analysis information. The syringe information for specifying the configuration of the syringe of the sample injector is acquired by the syringe information acquirer. Based on the analysis information and the syringe information, whether the syringe is suitable for analysis of the sample is judged by the judge. The result of judgement by the judge is presented by the presenter. In the analysis device, the sample is supplied to the analyzer with the syringe by the sample injector, and the sample is analyzed by the analyzer.

With this configuration, even in a case where being unskilled, the user can easily determine whether the syringe in use is suitable for analysis of the sample by identifying the result of judgement presented by the presenter. Thus, the syringe suitable for analysis of the sample can be easily selected. As a result, a result of accurate analysis of the sample can be easily acquired.

(Item 2) In the analysis system according to item 1, the presenter may present the result of judgement in a case where the judge judges that the syringe is unsuitable for analysis of the sample.

With this configuration, in a case where the syringe that is unsuitable for analysis of the sample is in use, the user can determine that the syringe is unsuitable for analysis of the sample by identifying the result of judgement presented by the presenter. Thus, the user can easily select the syringe suitable for analysis of the sample without selecting the syringe that is unsuitable for analysis of the sample.

(Item 3) In the analysis system according to item 1 or 2, the syringe information acquired by the syringe information acquirer may include any or all of a barrel size, a barrel material, a plunger size, a plunger material, a tip shape, a tip material and a size of a needle of the syringe.

In this case, whether the syringe in use is suitable for analysis of the sample can be more easily determined.

(Item 4) In the analysis system according to any one of items 1 to 3, the judge may judge that the syringe is unsuitable for analysis in a case where the analysis method represented by the method information is an on-column injection method, and a size of a needle of the syringe specified by the syringe information is larger than a predetermined size.

In this case, the user can cause the analysis device to perform the on-column injection method using an appropriate syringe. Thus, a result of accurate analysis of the sample by the on-column injection method can be easily acquired.

(Item 5) In the analysis system according to any one of items 1 to 4, the analysis device may further include a pre-processing device, and the judge may judge that the syringe is unsuitable for analysis, in a case where the pre-processing device specified by the device information prepares the sample by using a derivatizing agent, and the syringe specified by the syringe information does not include a fluororesin tip.

In this case, the user can cause the pre-processing device to perform the pre-process appropriately while preventing adherence of a derivatizing agent to the syringe or reaction of the syringe. Thus, a result of accurate analysis of the sample that has been adjusted with use of the derivatizing agent can be easily acquired.

(Item 6) In the analysis system according to any one of items 1 to 5, the analysis system may further include a setting changer that changes a setting such that the syringe becomes suitable for analysis of the sample, in a case where the judge judges that the syringe is unsuitable for analysis of the sample, when the syringe becomes suitable for analysis by a change of the setting in regard to a running condition of the analysis device.

With this configuration, it is not necessary for the user to change the setting in regard to the running condition of the analysis device. Thus, even in a case where being unskilled, the user can acquire a result of accurate analysis of the sample more easily. Further, an error in changing the setting by the user can be prevented.

(Item 7) In the analysis system according to item 6, the analysis device may further include an expendable part, the setting in regard to the running condition may include a setting in regard to the number of times that the expendable part is usable, the device information may further represent the setting in regard to the number of times that the expendable part is usable, and the judge may judge that the syringe is unsuitable for analysis of the sample, and the setting changer may change the setting such that the setting in regard to the number of times that the expendable part is usable becomes suitable for a size of a needle of the syringe, in a case where the setting in regard to the number of times that the expendable part is usable represented by the device information is unsuitable for the size of the needle of the syringe specified by the syringe information.

In this case, the expendable part is easily prevented from being used more than the number of times that expendable part is usable.

(Item 8) in the analysis system according to item 6 or 7, the setting in regard to the running condition may include a setting in regard to a moving speed of the syringe, the device information may further represent the setting in regard to the moving speed of the syringe, and the judge may judge that the syringe is unsuitable for analysis of the sample, and the setting changer may change the setting such that the setting in regard to the moving speed becomes suitable for a size of a needle of the syringe, in a case where the setting in regard to the moving speed represented by the device information is unsuitable for the size of the needle of the syringe specified by the syringe information.

In this case, the syringe can be moved at an appropriate speed corresponding to the size of needle. Thus, the needle of syringe can be easily prevented from bending or being damaged.

(Item 9) An analysis assistance device according to another aspect used by an analysis device including an analyzer for analyzing a sample and a sample injector that has a syringe and supplies the sample to the analyzer may include an analysis information acquirer that acquires at least one of method information representing an analysis method to be used for analysis of the sample and device information for specifying a configuration of the analysis device as analysis information, a syringe information acquirer that acquires syringe information for specifying a configuration of the syringe, a judge that judges whether the syringe is suitable for analysis of the sample based on the analysis information acquired by the analysis information acquirer and the syringe information acquired by the syringe information acquirer, and a presenter that presents a result of judgement by the judge.

With this analysis assistance device, even in a case where being unskilled, the user can easily determine whether the syringe in use is suitable for analysis of the sample by identifying the result of judgement presented by the presenter. Thus, the syringe suitable for analysis of the sample can be easily selected. As a result, a result of accurate analysis of the sample can be easily acquired.

(Item 10) An analysis execution method according to yet another aspect may include supplying a sample to an analyzer for analyzing a sample by a sample injector with use of a syringe in an analysis device, acquiring at least one of method information representing an analysis method to be used for analysis of the sample and device information for specifying a configuration of the analysis device as analysis information, acquiring syringe information for specifying a configuration of the syringe of the sample injector, judging whether the syringe is suitable for analysis of the sample based on the analysis information and the syringe information, and presenting a result of judgement.

With this analysis execution method, even in a case where being unskilled, the user can easily determine whether the syringe in use is suitable for analysis of the sample by identifying the result of judgement presented by the presenter. Thus, the syringe suitable for analysis of the sample can be easily selected. As a result, a result of accurate analysis of the sample can be easily acquired.

(Item 11) An analysis assistance method according to yet another aspect used by an analysis device that includes an analyzer for analyzing a sample and a sample injector that has a syringe and supplies the sample to the analyzer, may include acquiring at least one of method information representing an analysis execution method to be used for analysis of the sample and device information for specifying a configuration of the analysis device, acquiring syringe information for specifying a configuration of the syringe, judging whether the syringe is suitable for analysis of the sample based on the analysis information and the syringe information, and presenting a result of judgement.

With this analysis assistance method, even in a case where being unskilled, the user can easily determine whether the syringe in use is suitable for analysis of the sample by identifying the result of judgement presented by the presenter. Thus, the syringe suitable for analysis of the sample can be easily selected. As a result, a result of accurate analysis of the sample can be easily acquired.

While preferred embodiments of the present invention have been described above, it is to be understood that variations and modifications will be apparent to those skilled in the art without departing the scope and spirit of the present invention. The scope of the present invention, therefore, is to be determined solely by the following claims.

We claim:

1. An analysis system comprising:
   an analysis device that includes an analyzer for analyzing a sample and a sample injector that has a syringe and supplies the sample to the analyzer;
   an analysis information acquirer that acquires at least one of method information representing an analysis method to be used for analysis of the sample and device information for specifying a configuration of the analysis device as analysis information;
   a syringe information acquirer that acquires syringe information for specifying a configuration of the syringe;
   a judge that judges whether the syringe is suitable for analysis of the sample based on the analysis information acquired by the analysis information acquirer and the syringe information acquired by the syringe information acquirer; and
   a presenter that presents a result of judgement by the judge.

2. The analysis system according to claim 1, wherein the presenter presents the result of judgement in a case where the judge judges that the syringe is unsuitable for analysis of the sample.

3. The analysis system according to claim 1, wherein the syringe information acquired by the syringe information acquirer includes any or all of a barrel size, a barrel material, a plunger size, a plunger material, a tip shape, a tip material and a size of a needle of the syringe.

4. The analysis system according to claim 1, wherein the judge judges that the syringe is unsuitable for analysis in a case where the analysis method represented by the method information is an on-column injection method, and a size of a needle of the syringe specified by the syringe information is larger than a predetermined size.

5. The analysis system according to claim 1, wherein the analysis device further includes a pre-processing device, and
   the judge judges that the syringe is unsuitable for analysis, in a case where the pre-processing device specified by the device information prepares the sample by using a derivatizing agent, and the syringe specified by the syringe information does not include a fluororesin tip.

6. The analysis system according to claim 1, further comprising a setting changer that changes a setting such that the syringe becomes suitable for analysis of the sample, in a case where the judge judges that the syringe is unsuitable for analysis of the sample, when the syringe becomes suitable for analysis by a change of the setting in regard to a running condition of the analysis device.

7. The analysis system according to claim 6, wherein
   the analysis device further includes an expendable part,
   the setting in regard to the running condition includes a setting in regard to the number of times that the expendable part is usable,
   the device information further represents the setting in regard to the number of times that the expendable part is usable, and
   the judge judges that the syringe is unsuitable for analysis of the sample, and the setting changer changes the setting such that the setting in regard to the number of times that the expendable part is usable becomes suitable for a size of a needle of the syringe, in a case where the setting in regard to the number of times that the expendable part is usable represented by the device information is unsuitable for the size of the needle of the syringe specified by the syringe information.

8. The analysis system according to claim 6, wherein
   the setting in regard to the running condition includes a setting in regard to a moving speed of the syringe,
   the device information further represents the setting in regard to the moving speed of the syringe, and
   the judge judges that the syringe is unsuitable for analysis of the sample, and the setting changer changes the setting such that the setting in regard to the moving speed becomes suitable for a size of a needle of the syringe, in a case where the setting in regard to the moving speed represented by the device information is unsuitable for the size of the needle of the syringe specified by the syringe information.

9. An analysis assistance device used by an analysis device including an analyzer for analyzing a sample and a sample injector that has a syringe and supplies the sample to the analyzer, comprising:
   an analysis information acquirer that acquires at least one of method information representing an analysis method to be used for analysis of the sample and device information for specifying a configuration of the analysis device as analysis information;
   a syringe information acquirer that acquires syringe information for specifying a configuration of the syringe;
   a judge that judges whether the syringe is suitable for analysis of the sample based on the analysis information acquired by the analysis information acquirer and the syringe information acquired by the syringe information acquirer; and
   a presenter that presents a result of judgement by the judge.

10. An analysis execution method including:
    supplying a sample to an analyzer for analyzing a sample by a sample injector with use of a syringe in an analysis device;
    acquiring at least one of method information representing an analysis method to be used for analysis of the sample and device information for specifying a configuration of the analysis device as analysis information;

acquiring syringe information for specifying a configuration of the syringe of the sample injector;

judging whether the syringe is suitable for analysis of the sample based on the analysis information and the syringe information; and presenting a result of judgement.

11. An analysis assistance method used by an analysis device that includes an analyzer for analyzing a sample and a sample injector that has a syringe and supplies the sample to the analyzer, including:

acquiring at least one of method information representing an analysis execution method to be used for analysis of the sample and device information for specifying a configuration of the analysis device;

acquiring syringe information for specifying a configuration of the syringe;

judging whether the syringe is suitable for analysis of the sample based on the analysis information and the syringe information; and presenting a result of judgement.

* * * * *